Nov. 3, 1936. G. W. GOODMAN Re. 20,157

CROSSING GUARD

Original Filed April 27, 1931 5 Sheets-Sheet 1

INVENTOR:
GLENN W. GOODMAN, DEC'D.
BY WILLIAM B. ROSENFIELD,
EXECUTOR.
by J. H. Weatherford
ATTY.

Nov. 3, 1936. G. W. GOODMAN Re. 20,157

CROSSING GUARD

Original Filed April 27, 1931 5 Sheets-Sheet 2

INVENTOR:
GLENN W. GOODMAN, DEC'D., BY
WILLIAM B. ROSENFIELD, EXECUTOR.
by J. H. Weatherford
ATTY.

Nov. 3, 1936. G. W. GOODMAN Re. 20,157

CROSSING GUARD

Original Filed April 27, 1931 5 Sheets-Sheet 3

INVENTOR:
GLENN W. GOODMAN, DEC'D.
BY WILLIAM B. ROSENFIELD,
EXECUTOR.

by J. H. Weatherford
ATTY.

Nov. 3, 1936. G. W. GOODMAN Re. 20,157

CROSSING GUARD

Original Filed April 27, 1931 5 Sheets-Sheet 4

INVENTOR:
GLENN W. GOODMAN, DEC'D.
BY WILLIAM B. ROSENFIELD,
EXECUTOR.

by J. H. Weatherford
ATTY.

Nov. 3, 1936. G. W. GOODMAN Re. 20,157

CROSSING GUARD

Original Filed April 27, 1931 5 Sheets-Sheet 5

INVENTOR:
GLENN W. GOODMAN, DEC'D.
BY WILLIAM B. ROSENFIELD,
EXECUTOR.

By J. H. Wrakerford
ATTY.

Reissued Nov. 3, 1936

Re. 20,157

UNITED STATES PATENT OFFICE 20,157

CROSSING GUARD

Glenn W. Goodman, deceased, late of Memphis, Tenn., by William B. Rosenfield, executor, Memphis, Tenn., assignor to The Grade Crossing Guard Corp., Memphis, Tenn., a corporation of Tennessee Original No. 1,878,234, dated September 20, 1932, Serial No. 533,023, April 27, 1931. Application for reissue September 18, 1934, Serial No. 744,722

27 Claims. (Cl. 39—6)

This invention relates to devices for guarding the approach of streets or highways to railroad grade crossings, or other street or highway crossings and/or intersections, and particularly to devices which are actuated by the approach of a train to said crossings and/or intersections, and which interpose first a warning signal and thereafter a positive barrier to prevent vehicles from reaching the crossing. The invention is of the same general class of apparatus as is shown in prior Patent No. 1,494,540.

The objects of this invention are:

First to provide a device of the character described which will rise quickly to warning position, then slowly through a limited period and thereafter rises rapidly to blocking position;

To provide means for accomplishing this varying speed;

To provide means for absorbing the shock incidental to a vehicle striking the barrier independent of the hinging means;

To provide means for supporting loads crossing the barrier independent of the hinging means; and To provide means whereby vehicles leaving the crossing will not be impeded in their movement.

The means by which the foregoing and other objects are accomplished and the manner of their accomplishment will readily be understood from the following specification on reference to the accompanying drawings, in which.

Figure 1:
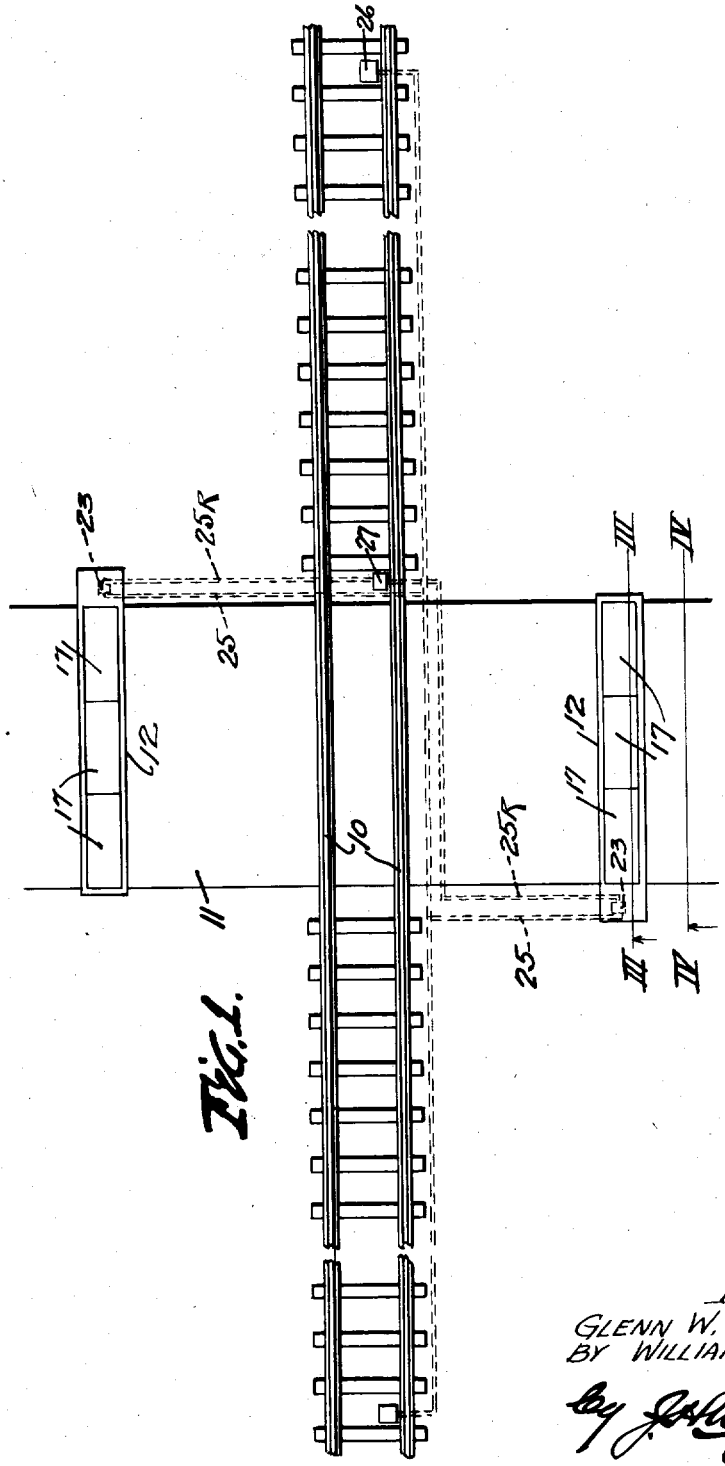
Fig. 1 is a plan view of the tracks and highway at a grade crossing, showing my invention applied in operative position.

Referring now to the drawings in which the various parts are indicated by numerals, 10 are the rails of a railroad track, and 11 a highway which crosses the track at grade.

At predetermined distances from the track and extending transversely across the highway, pits are provided in which are disposed metal boxes or casings 12. Preferably the sides 13, 14 of those boxes are of channel iron, the channels being connected at their ends by cross channels forming the ends of the boxes, and at intervals, by smaller transverse supporting channels 15 extending across the bottom of the box, all of these parts preferably being secured together by welding.

Preferably concrete bottoms 16 are placed in the pits and the boxes 12 placed thereon and concreted in. Each box is provided with a hinged top 17 made up of a plurality of sections, which may be independently depressed so that any section can be depressed by a vehicle which has crossed and is leaving the track without affecting those sections which at the same time are blocking approach to the track. Each section is provided with two or more hinges each comprising a block 18 secured to the underside of the top adjacent the back edge thereof and carrying a hinge pin 19 which pin is supported by a pair of resilient brackets 20 which are secured to and supported by the back channel 14 of the box. These hinges are here shown as plain pin bearings, but it will of course be understood that any of the usual types of ball or roller bearing may be employed in the hinges if it be so desired.

Figure 2:
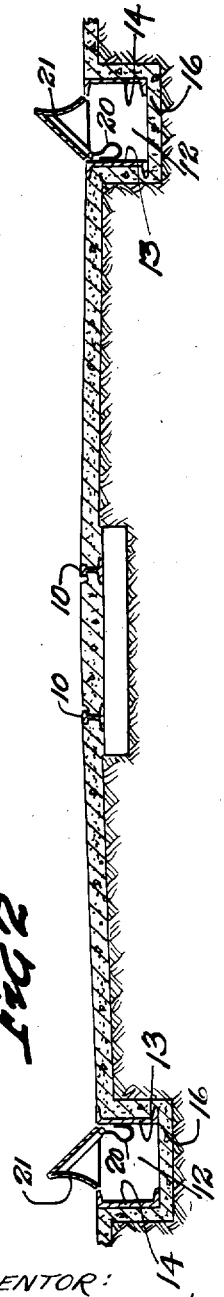
Fig. 2 is a vertical section taken substantially along the center line of the highway and showing the guard set in blocking position as by an approaching train.
Figure 3:
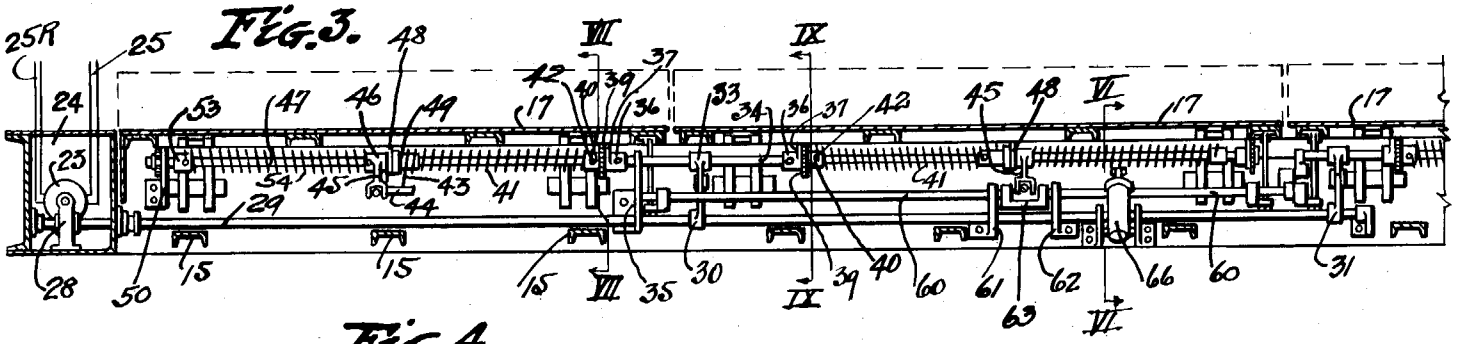
Fig. 3 is a section taken as on the line III—III of Fig. 1.
Figure 6:
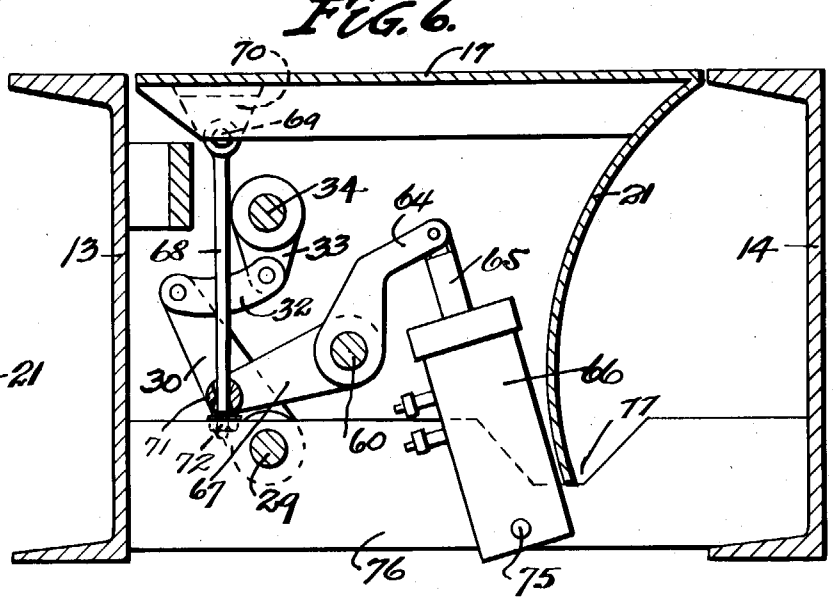
Fig. 6 is a transverse section on the line VI—VI of Fig. 3, showing the guard in lowered position and the dash pot which regulates raising speed.
Figure 7:
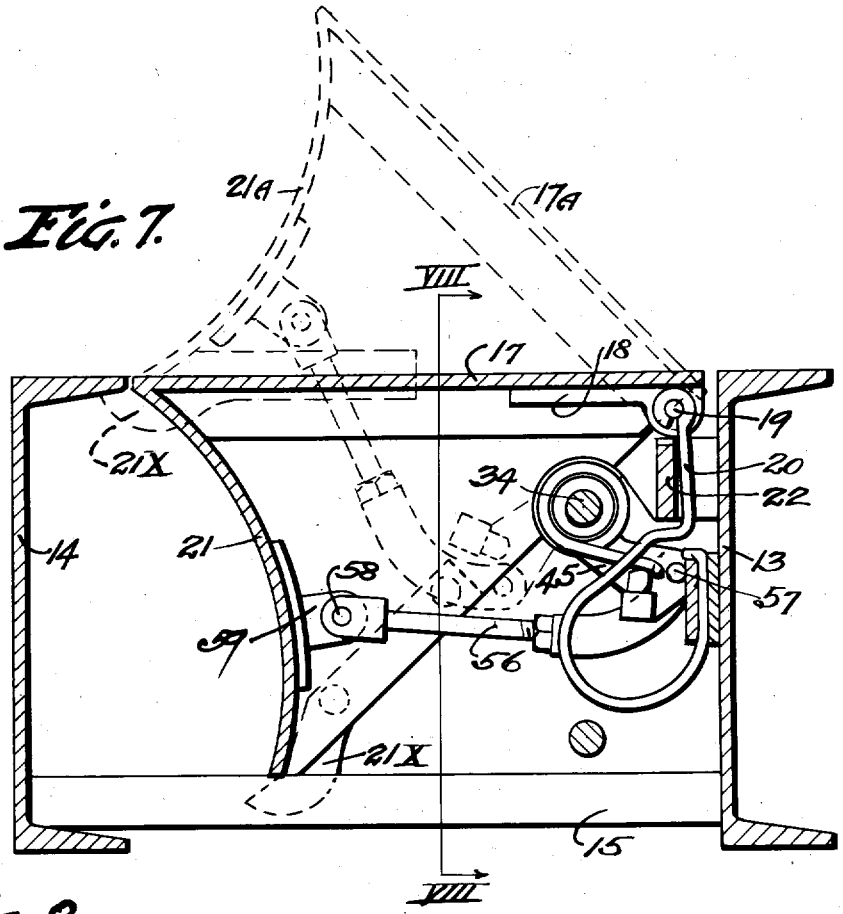
Fig. 7 is a similar section taken as on the line VII—VII of Fig. 3.
Figure 8:
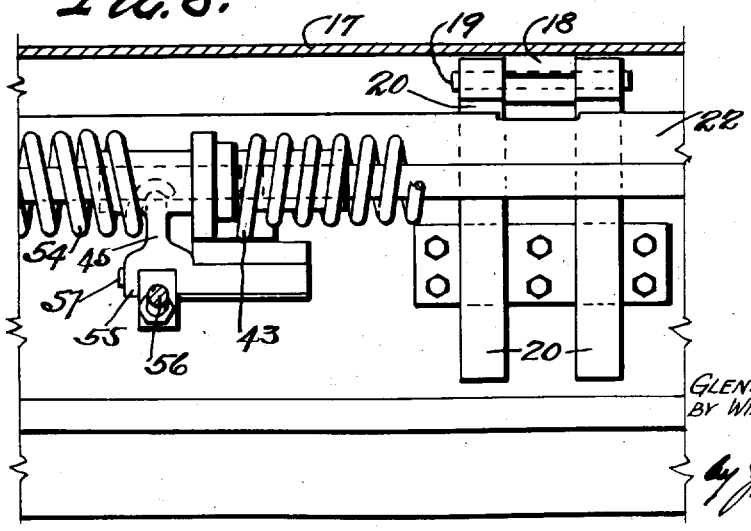
Fig. 8 is a fragmentary section taken on the line VIII—VIII of Fig. 7.
Figure 9:
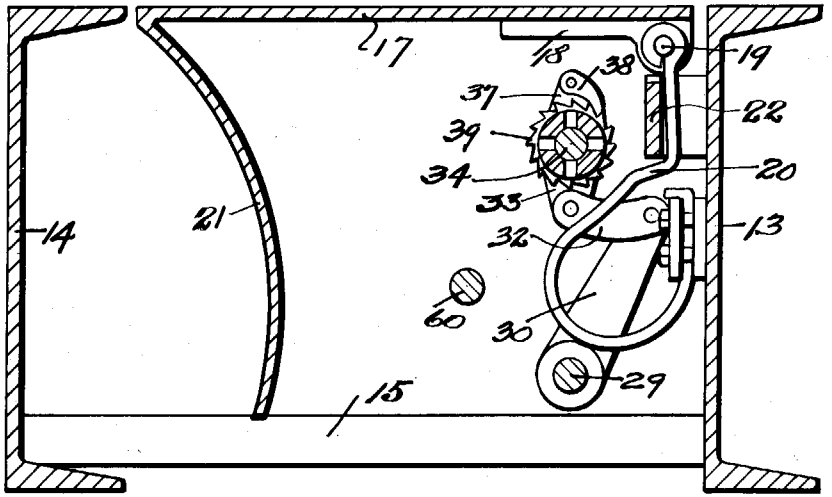
Fig. 9 is a section on the line IX—IX of Figs. 3 and 10.
Figure 10:
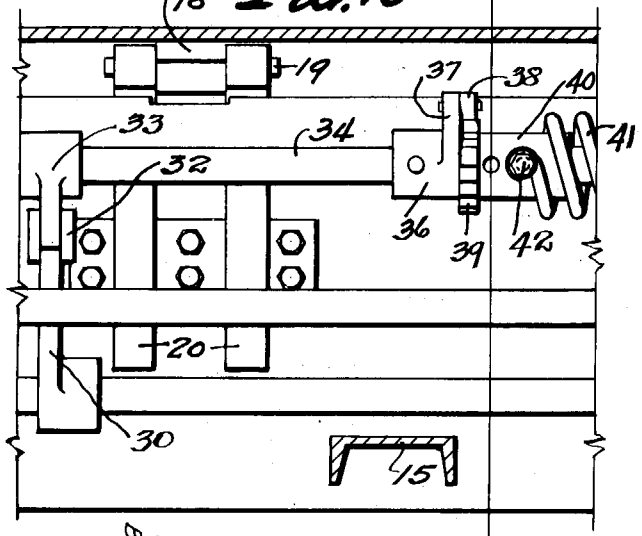
Fig. 10 is a fragmentary sectional elevation of the parts adjacent the line IX—IX of Fig. 3.
Figure 11:
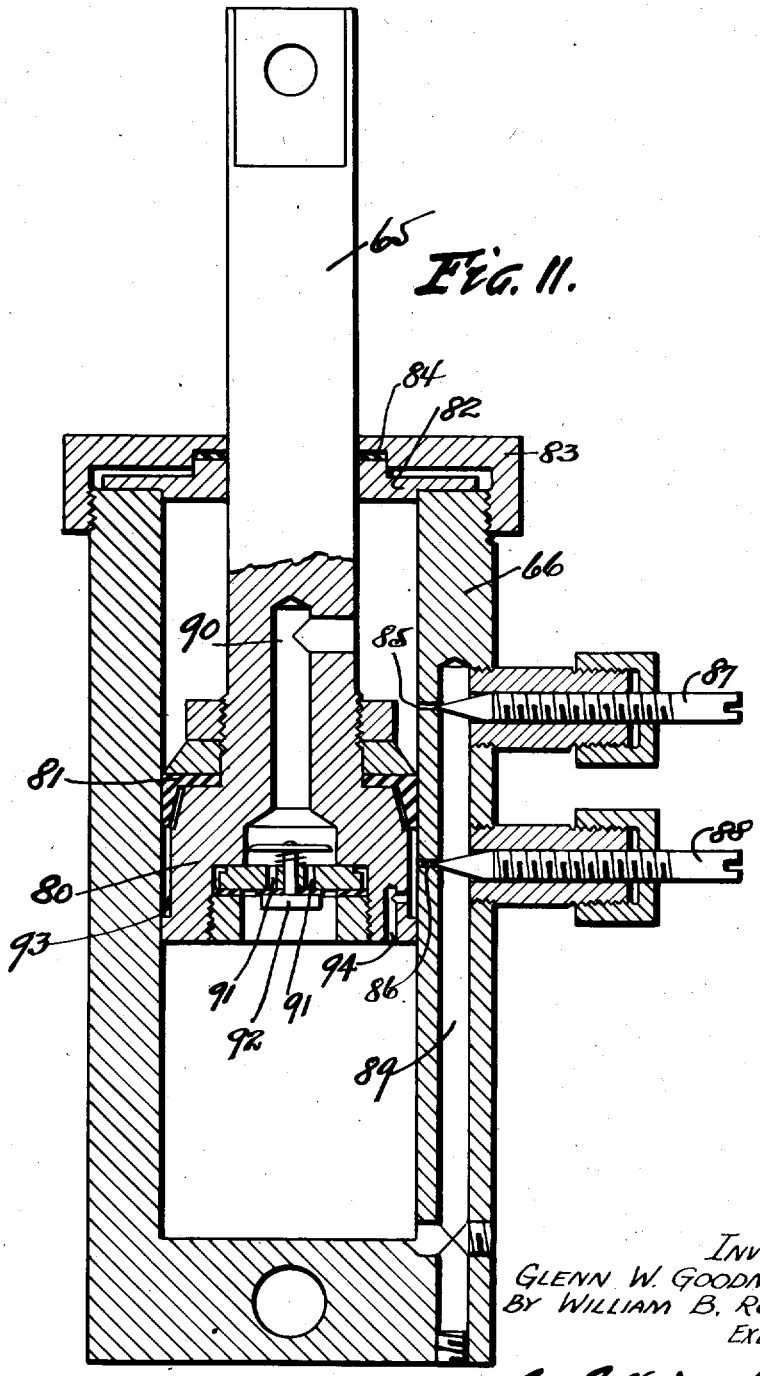
Fig. 11 is an enlarged section of the control dash pot.

Depending from the front edge of the top is an arcuate stop plate or bumper 21 which bumper is adapted to be swung upward to the dotted position 21—A of Fig. 7, being the positions also indicated in Fig. 2, to form a stop sign and bumper. In accomplishing the movement to the position 21—A the top 17 moves to the position 17—A.

When in lowered position the bumper 21 rests on the supporting channels 15 and supports the front edge of the top 17, at the same time the back edge of the top is supported by the hinge before described. In such position however, any weight passing over the top depresses the resilient hinge brackets 20 and brings the hinge block 18 to bear on a support 22 which is carried by the rear channel 13, thus providing a solid support independent of the hinge. Likewise in raised position the thrust incident to the impact of a moving vehicle causes the resilient hinge bracket 20 to move rearwardly and transfer such thrust directly to the channel 13 forming the back of the box. In resisting such action, the front edge of the top section is held against lifting, by engagement of lugs 21—X (Fig. 7) with the underside of the top flange of the front channel 14. The hinge may therefore be made of only sufficient strength to support the weight of the parts instead of being of the strength necessary to support the load or absorb the impact shocks, and hinge movement of the top may be made without undue friction.

All the top sections of both boxes are raised concurrently. Each box is provided with a reversible motor 23 which preferably is located in an independent compartment 24, at the end of the box. Each motor is connected by suitable current wires 25, 25 R which may be a part of the block lighting system now almost universally employed on railroads, or independent wiring and current source may be used. The current wires lead from both motors to and along the tracks to remote control boxes 26 which are actuated by the passing of a train.

27 is a control box located adjacent the highway which box acting through the current wires 25 R reverse the motors when the train reaches the crossing. The detail and action of these control devices being well known in block signal practice and not being specifically a part of the present invention need not be herein set out. Each motor is connected by suitable gearing 28 preferably worm gearing with a shaft 29 extending longitudinally of the box.

Secured to the shaft 29 are arms 30 and 31 which are oscillated thereby, the action of these being identical except that the arms 30 actuate two sections, and the arm 31 one section, three sections having been shown in the present device. Each arm may handle two sections only so that were four sections shown, two arms only would still be necessary, whereas with five or six sections three arms would be necessary. The arm is connected through a link 32 with a second arm 33 mounted on and secured to a rocker shaft 34, and the arm 31 similarly connected.

The shaft 34 is supported by brackets 35 which are secured to and extend outward from the back channel 13. Mounted on and secured to the shaft 34 as by pins, are hubs 36 from which project arms 37 each having a pawl 38, which engages the teeth of corresponding ratchets 39. The ratchets 39 are in turn provided with hubs 40 to which torsion springs 41 are secured by pins 42. These torsion springs are disposed around the shaft 34, extend therealong in opposite directions from the hubs 40 and have their opposite ends 43 engaged with lugs 44 which extend from forked lifting arms 45. Each of the arms 45 is provided with an integral hub from which it extends, the hubs being oscillatably mounted on non-rotating shafts 47 which are in direct alignment with the shaft 34.

Each of these shafts 47 is supported at one end by a bracket 48 through which it extends. 49 are sleeves mounted on and supported by the projecting ends of shafts 47. The ends of the shaft 34 also extend into the sleeves 49 and are supported thereby, the sleeves preferably being secured on the ends of this latter shaft as by set screws. The opposite ends of the shafts 47 are carried by brackets 50, through which they project. Secured on these projecting ends are ratchets 51, which are held against rotation by pawls similar to the pawls 28. Disposed on and secured to the shaft 47 is a collar 53 and disposed around the shaft is a balance spring 54 which has one end secured to the collar 53 and the opposite end to the lifting arm 45. This spring acts to lift a top section 17 and is adjusted to practically balance the weight thereof by tightening it through the ratchet 51. Each of the sections is similarly balanced.

The lifting arm 45 is provided with a yoke 55 to which a connecting rod 56 is connected by a pin 57. The opposite end of this connecting rod 56 is connected by a pin 58 and bracket 59 with the arcuate bumper 21, of its top section 17, each top section being similarly connected.

Disposed parallel to the driving shaft 29 and the rocker shaft 34, is a countershaft 60 which shaft is oscillatably mounted in the bracket 35 and additional brackets as 61, 62. This shaft crosses the path of one of the lifting arms 45 and for that reason is provided with an offset yoke 63 which lies between the bracket 61 and 62. This yoke is rigidly connected to the two sections of the countershaft 60 and causes these sections to act as a single straight shaft. Mounted on and rigidly secured to the countershaft 60 is an arm 64 which is pin connected to the plunger 65 of a dash pot 66, the action of which will be hereinafter described. Likewise secured to the shaft 60 are a plurality of arms 67, one for each of the top sections. Depending from each top section is a rod 68, connected by a pin 69 and a bracket 70, with its top section and which rod passes through a suitable hole in a hub 71 which projects laterally from the arm 67. Disposed on the end of the rod 68 is a nut 72. The rod 68 may thus move freely downward through the hub 71 but is prevented from moving upward when the nut 72 seats against the underside of the hub 71.

The dash pot 66 is pivotally supported by a pin 75 which projects laterally therefrom near the bottom thereof and which in turn is supported by a pair of transverse members 76 extending from the front channel 14 to the rear channel 13 and preferably secured thereto as by welding. These transverse members also serve as supports for the shaft 29 and are cut away at 77 so that they may not interfere with the downward swing of the arcuate bumper 21.

The dash pot 66 comprises a hollow cylinder in which is mounted a plunger 80, this plunger being provided with the usual cup leather 81. The upper end of the dash pot is closed by an annular flange 82 secured in place by an annular cap 83 between which may be disposed stem packing 84 should it be so desired. Intermediate the height of the cylinder wall are ports 85, 86, which are independently regulated by needle valves 87, 88 respectively. These ports lead from a passageway 89 which is in communication with the interior of the bottom of the cylinder.

The plunger 80 is provided with a central passageway 90 in direct communication at its upper end with the interior of the cylinder and at its lower end has ports 91 which are closed on the downward stroke of the plunger by a spring controlled check valve 92, which valve opens on the upward stroke of the plunger to allow free return flow from the upper part of the cylinder to the lower part thereof. The plunger also is provided with an annular passageway 93 which is in communication through a suitable passageway with the bottom of the cylinder.

It will be understood that the dash pot is substantially filled with oil, that it acts only on the downward stroke of the plunger and that at the beginning of such stroke the cup leather 81 is positioned immediately below the port 85. Downward movement of the plunger forces oil through the passageway 89 and the port 85 into the upper part of the cylinder. The speed with which oil flow is allowed is controlled by the amount of opening of the needle valve 87, and this particular speed of flow continues until the cup leather passes the port 86, thereby establishing communication through both ports to the upper portion of the cylinder. Thereafter such speed of flow as may be desired may be obtained by regulation of the needle valve 88.

Figure 4:
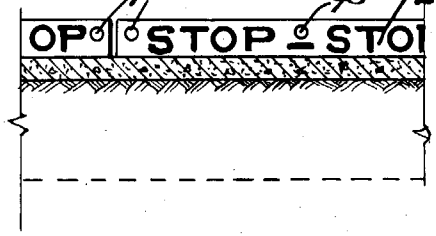
Figs. 4 and 5 are fragmentary sections taken as on the line IV—IV of Fig. 1, showing a front view of the guard in partially raised or warning position and in fully raised or blocking position respectively.
Figure 5:
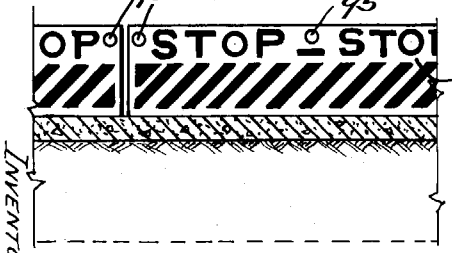

The arcuate bumper 21 of the sections is preferably painted as shown in Figs. 4 and 5 with the word Stop repeated such number of times as may be desired, occupying an upper belt somewhat less than half the depth of the bumper, and with alternate black and white lines as shown in Fig. 5, occupying the lower and larger belt. If desired red glass reflectors 95 such as are commonly used in stop signs may be inserted along the upper edge of the block between the various repetitions of the word Stop and should it be so desired light bulbs may be positioned as is usual behind any or all of these, such lights being operated by the same circuit as that which operates the motors.

In using this device two of the boxes are installed at each crossing of the highway with the railroad. Each box having the bumper facing away from the track and in the path of approaching vehicles.

During the time when no trains are approaching the crossing, the tops of the boxes lie flush with the pavement, vehicles passing thereover merely slightly depressing the hinged edges so that the weight of the vehicles is carried by solid material.

As a train approaches, the engine passing the control box establishes a circuit through the motor which is maintained during the minute fraction of time, ordinarily from three to five seconds which is necessary for the actuation of the motor to raise the tops 17 and bumpers 21 to their full height. Thereafter the control box, as is usual in such devices, cuts off and is not further affected by train movement and such inaction continues until the usual time relay of such control again acts or until the train reaches the crossing and acting through the control box at such point reverses the action of the motor for a similar length of time.

During the action of the motor the shaft 29 is oscillated approximately 90 degrees moving the arm 30, the connecting link 32 and the shaft 34 correspondingly. This motion is transmitted to the lifting springs 41 and these springs are given the full amount of movement necessary to raise the box tops to their full height and the strain necessary for such purpose is transmitted through these springs to the lifting arms 45 and through these arms and the connecting rods 56 to the bumpers and top sections. This strain acts almost instantaneously to raise the bumpers and display the warning lights and the words Stop. At this time also the nuts 72 of the rods 68 seat against the hubs 71 of the arms 67, and through the countershaft 60 and arm 64 the dash pot action is brought into play to check and regulate further movement. Further movement of these parts is accomplished only at such speed as the dash pot will allow. This upward movement which may be regulated as desired by adjustment of the needle valves is thereafter very slow until the cup leather of the plunger in its downward movement reaches and passes the lower port so that the warning words Stop which were quickly moved into position, for an additional period, move very slowly and give ample warning to approaching traffic that the device is in operation, and a train is approaching. During such upward movement and until the end of this second period upward projection of the stop block is so slight that an approaching vehicle readily forces the bumper downward and passes thereover so that vehicles which are too close to the sign to stop may with safety and without discomfort pass over the device. It will be noted in this connection that only the lifting power of the springs need be overcome and that such downward motion merely relieves the pressure on the dash pot but is in no way affected by or transmitted to the dash pot itself.

At the end of this second period the dash pot plunger uncovers the lower needle valve port and rapid upward movement of the sign and stop block is permitted. Thereafter the device becomes an actual bumper to positively prevent vehicles approaching the track, and vehicles approaching which have not obeyed the command of the stop sign are forcibly prevented from passing.

It will of course be understood that in any position of the tops, a vehicle passing away from the tracks may push the tops down and pass thereover with entire ease and safety, and that immediately after such passage the device will resume its blocking and warning position.

It will be understood that the balance springs are for the purpose of balancing the weight of the tops so that the only work of the lifting spring is to accomplish the movement of the parts. It will be further understood that since the entire support of passing vehicles and the shock of impact is borne by solid abutments within the boxes and not by the hinges that these hinges may be made comparatively light and the actuation thereof will require little power.

The foregoing description has been confined to the device as applied to a highway approach to a railroad crossing but it will readily be understood that it is equally applicable to street or highway crossings or intersection with other streets or highways.

Having described the invention, what is claimed is:

1. A crossing guard, comprising a bumper disposed across a highway approach to said crossing below the surface thereof and adapted to be elevated above said surface, an intermediate member actuatably carried by said casing, resilient means connecting said intermediate member and said bumper, means for actuating said intermediate member to raise said bumper, and means connected to said bumper for restraining upward speed thereof, and means for decreasing restraining action at a predetermined point.

2. A guard for a crossing, comprising a bumper disposed across a highway approach to said crossing below the surface thereof, and adapted to be elevated above said surface, an intermediate member actuatably carried by said casing, resilient means connecting said intermediate member and said bumper, means for actuating said intermediate member to raise said bumper, means connected to said bumper for restraining upward speed thereof, and means actuated by said restraining means for decreasing restraining action at a predetermined point.

3. A guard for a crossing, comprising a bumper disposed across a highway approach to said crossing below the surface thereof and adapted to be elevated above said surface, an intermediate member actuatably carried by said casing, resilient means connecting said intermediate member and said bumper, means for actuating said intermediate member to raise said bumper, means connected to said bumper for restraining upward speed thereof, means actuated by said restraining means for decreasing restraining action at a predetermined point, and means for reversely actuating said member.

4. In a guard for a crossing, a casing, a cover therefor, a bumper secured to the front edge of said cover, extending downward and seating within said casing to support the front edge of said cover, a support carried by said casing and disposed below the rear of said cover and a resiliently supported hinge secured to said cover and said casing, normally supporting the rear of said cover out of contact with said support.

5. In a guard for a crossing, a casing, a cover therefor, a bumper secured to the front edge of said cover, extending downward and seating within said casing to support the front edge of said cover, a support carried by said casing and disposed below the rear of said cover, an abutment disposed behind said cover, and resiliently supported hinges secured to said cover and said casing, normally supporting the rear of said cover out of contact with said support, and said abutment.

6. In a guard for a crossing, a casing, a cover therefor, a bumper secured to the front edge of said cover, extending downward and seating within said casing to support the front edge of said cover, a support carried by said casing and disposed below the rear of said cover and hinges each having one leg secured to said cover and each having a resilient leg secured to said casing, said hinges normally supporting the rear of said cover out of contact with said support.

7. In a guard for a crossing, a casing, a cover therefor, hinges each having one leg secured to the rear edge of said cover and each having a resilient leg secured to said casing, a bumper depending from the front edge of said cover within said casing, and supported therein, and a support within said casing for the rear edge of said top, said top being normally held out of engagement with said support by said hinge.

8. A guard for a crossing, comprising a casing, a hinged cover therefor and means for raising said cover; said casing having a re-entrant top front edge, said cover having its hinges resiliently supported by said casing, said casing extending upward behind said cover to form an abutment for the rear thereof, a support integral with said casing extending beneath the rear of said cover, but out of contact therewith, a bumper secured to the forward edge of said cover and depending within said casing, and members extending forwardly from the lower edge of said bumper, and adapted to engage said re-entrant edge when said cover is raised, whereby raising of said top is limited and thrust due to impact against said bumper is taken by said members and said support independent of said hinges.

9. A guard for a crossing, comprising a bumper disposed across a highway approach to said crossing below the surface thereof and adapted to be elevated above said surface, means for exerting pressure to raise said bumper, means connected to said bumper for restraining upward speed thereof, and means for decreasing such restraining action at a predetermined point.

10. A guard for a crossing, comprising a bumper disposed across a highway approach to said crossing below the surface thereof and adapted to be elevated above said surface, means for exerting pressure to raise said bumper and for releasing said pressure, means connected to said bumper for restraining the raising speed thereof, and means for decreasing such restraining action at a predetermined point.

11. A highway guard comprising a bumper disposed across the highway below the surface thereof and adapted to be elevated above said surface, means for raising said bumper to a warning position, said warning position being such that vehicles going in both directions may cross thereover and said means thereafter raising said bumper to a barrier position, such barrier position being such that vehicles going in one direction are prevented from passing thereover.

12. A highway guard comprising a bumper disposed across the highway below the surface thereof and adapted to be elevated above said surface, means for raising said bumper to a warning position, said warning position being such that vehicles going in both directions may cross thereover and said means thereafter raising said bumper to a barrier position, such barrier position being such that vehicles going in one direction are prevented from passing thereover, said bumper being depressible so that vehicles going in the opposite direction may pass thereover.

13. A highway guard for a railway crossing comprising a bumper disposed across the highway approach to said crossing below the surface thereof and adapted to be elevated above said surface, means for raising said bumper to a warning position, said warning position being such that vehicles going in both directions may cross thereover, and said means thereafter raising said bumper to a barrier position, such barrier position being such that vehicles going toward said railroad crossing are prevented from passing thereover, said bumper being depressible so that vehicles going in the opposite direction may pass thereover.

14. A highway guard comprising a bumper disposed across the highway below the surface thereof and adapted to be elevated above said surface, means for elevating said bumper, and means for effecting a hesitation to said movement during the initial elevating movement to provide a warning.

15. A highway guard comprising a bumper disposed across the highway below the surface thereof and adapted to be elevated above said surface, means for raising said bumper to an elevated position, and control means for said moving means to cause said movement to occur in a plurality of successive distinct steps.

16. A highway guard comprising a bumper disposed across the highway below the surface thereof and adapted to be elevated above said surface, means to elevate said bumper, and control means for said elevating means effective to vary the speed of movement of said bumper and thereby segregate said bumper movement into a warning stage and a final stage.

17. A highway guard comprising a bumper disposed across a highway below the surface thereof and adapted to be elevated above said surface, means to elevate said bumper, and control means for said elevating means actuable in accordance with the movement of said elevating means for effecting a hesitation in the movement of said bumper.

18. A highway guard comprising a bumper disposed across a highway below the surface thereof and adapted to be elevated above said surface, means to elevate said bumper, and means to segregate said elevating movement into a plurality of stages including a warning stage, comprising means controlled in accordance with the movement of said elevating means.

19. A protective device comprising a guard; means for normally supporting said guard in a retracted position with respect to a supporting surface; means for moving said guard to an extended position; mechanism connecting said guard and said moving means comprising means actuable in accordance with the movements of said guard and effective to vary the speed of movement of said guard and thereby segregate the movements of said guard into an initial warning movement and a final elevating movement.

20. In a protective device, a guard; means for normally supporting said guard in a retracted position with respect to a supporting surface; means for moving said guard to an elevated position comprising a fluid pressure operated device; and means responsive to the movement of said barrier for controlling said fluid pressure device to thereby control the rate of movement of said guard.

21. A guard comprising an elongated casing having front and rear walls, a projectable and retractable cover for said casing having a bumper face formed thereon, said face being disposed when said cover is in the retracted position to extend downwardly within said casing, and means including a plurality of transverse supports extending between said front and rear walls adjacent the base of said casing for engagement by said bumper face to support the same when in retracted position.

22. A guard comprising an elongated casing having front and rear walls, a projectable and retractable cover for said casing having a bumper face adjacent one edge thereof disposed to extend downwardly into said casing when in retracted position, means forming a pivotal connection between an opposite edge of said cover and casing, and means including a plurality of transverse supports extending between said front and rear walls adjacent the base of said casing for engagement by said bumper face to support the same.

23. In a guard comprising an elongated retractably and projectably supported barrier member, the combination of a rotatable drive shaft associated with said barrier and extending parallel thereto, a torsion spring, means supporting said torsion spring in spaced parallel relation to said drive shaft, means forming a connection between one end of said torsion spring and said barrier, and additional means forming a connection between the other end of said spring and said drive shaft.

24. In a guard comprising a retractably and projectably supported barrier, the combination of a rotatable drive shaft extending parallel to a face of said barrier, a second shaft, a torsion spring carried by said second shaft, means forming a connection between one end of said torsion spring and said barrier, and means forming an actuating connection between the other end of said torsion spring and said drive shaft.

25. A guard comprising an elongated casing having front and rear walls, a projectable and retractable cover for said casing formed as a bumper, means supporting said cover in said casing for movement between projected and retracted positions, said supporting means being arranged to permit said cover to directly engage said casing in the event of impact on said bumper so that forces of said impact are transmitted directly from said cover to said casing.

26. A guard comprising an elongated casing having front and rear walls, a projectible and retractable cover for said casing formed to provide a bumper, means resiliently supporting said cover in said casing, and means including an abutment formed in said casing and disposed to be directly engaged by said cover in the event of impact on said bumper, so that forces of said impact are transmitted directly from said cover to said casing.

27. In a guard comprising a retractable and projectable barrier, control means for said barrier actuable to effect a projecting movement thereof to a projected position including resilient means, said control means being adapted to permit a depressing movement of said barrier against the force of said resilient means, said resilient means being effective after said depressing movement to cause a return movement of said barrier to said projected position, and speed retarding means associated with said barrier for controlling the rate of said return movement.

WILLIAM B. ROSENFIELD,
*Executor of the Last Will and Testament of Glenn W. Goodman, Deceased.*